No. 884,404.
P. H. MORRIS.
STORE WINDOW.
APPLICATION FILED DEC. 12, 1907.
PATENTED APR. 14, 1908.
3 SHEETS—SHEET 1.
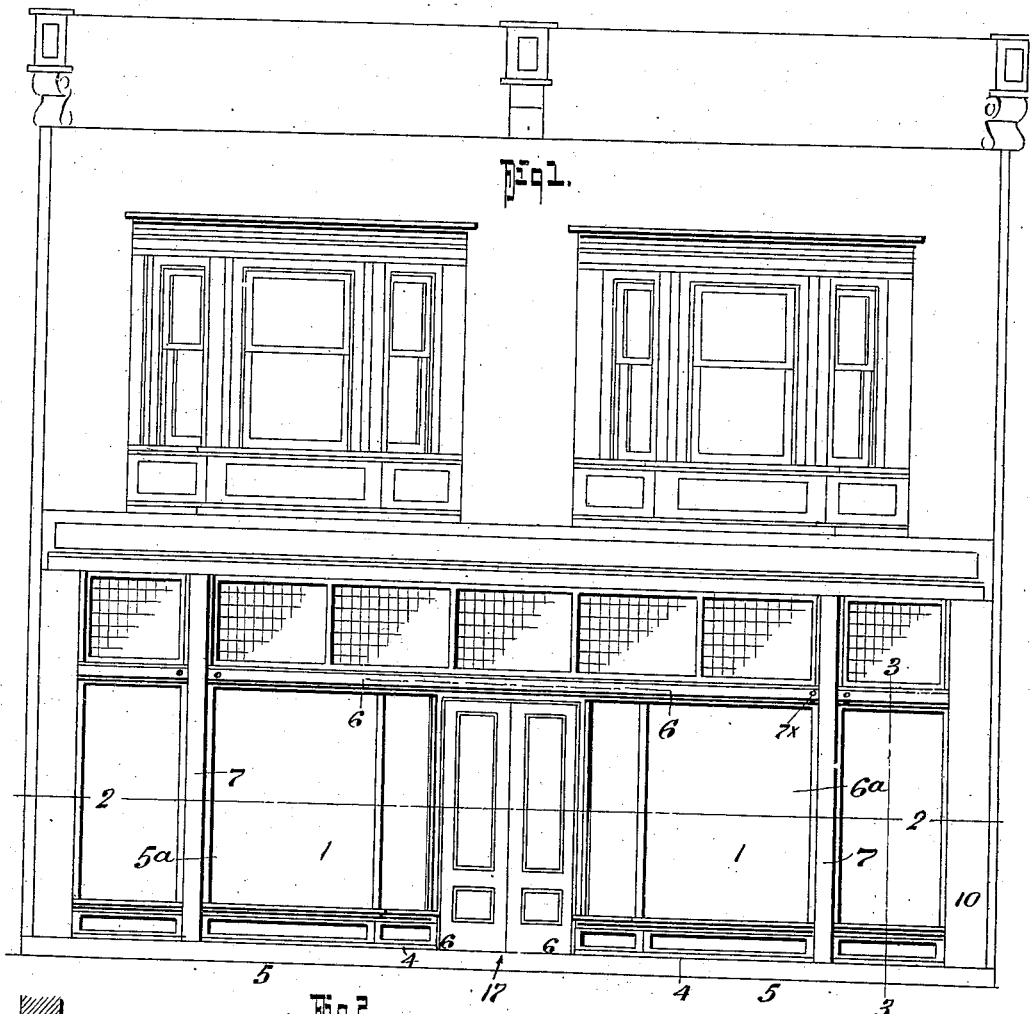
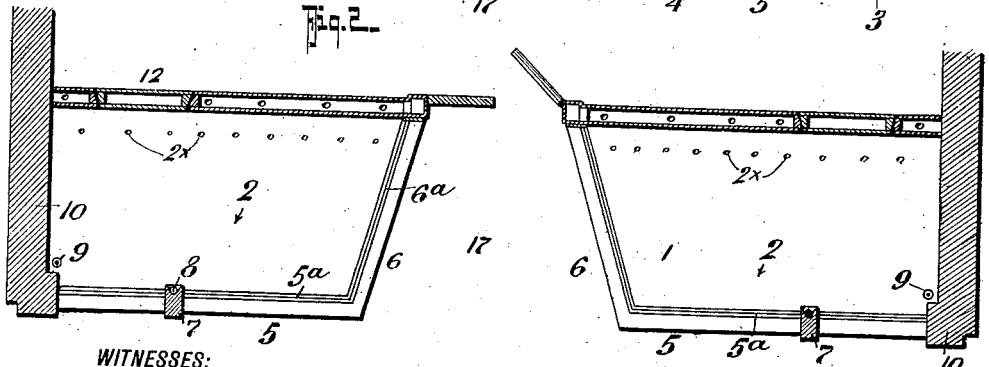
WITNESSES:
John T. Schrott
H. Woodard
INVENTOR
Peter H. Morris.
BY
Fred G. Dieterich
ATTORNEYS

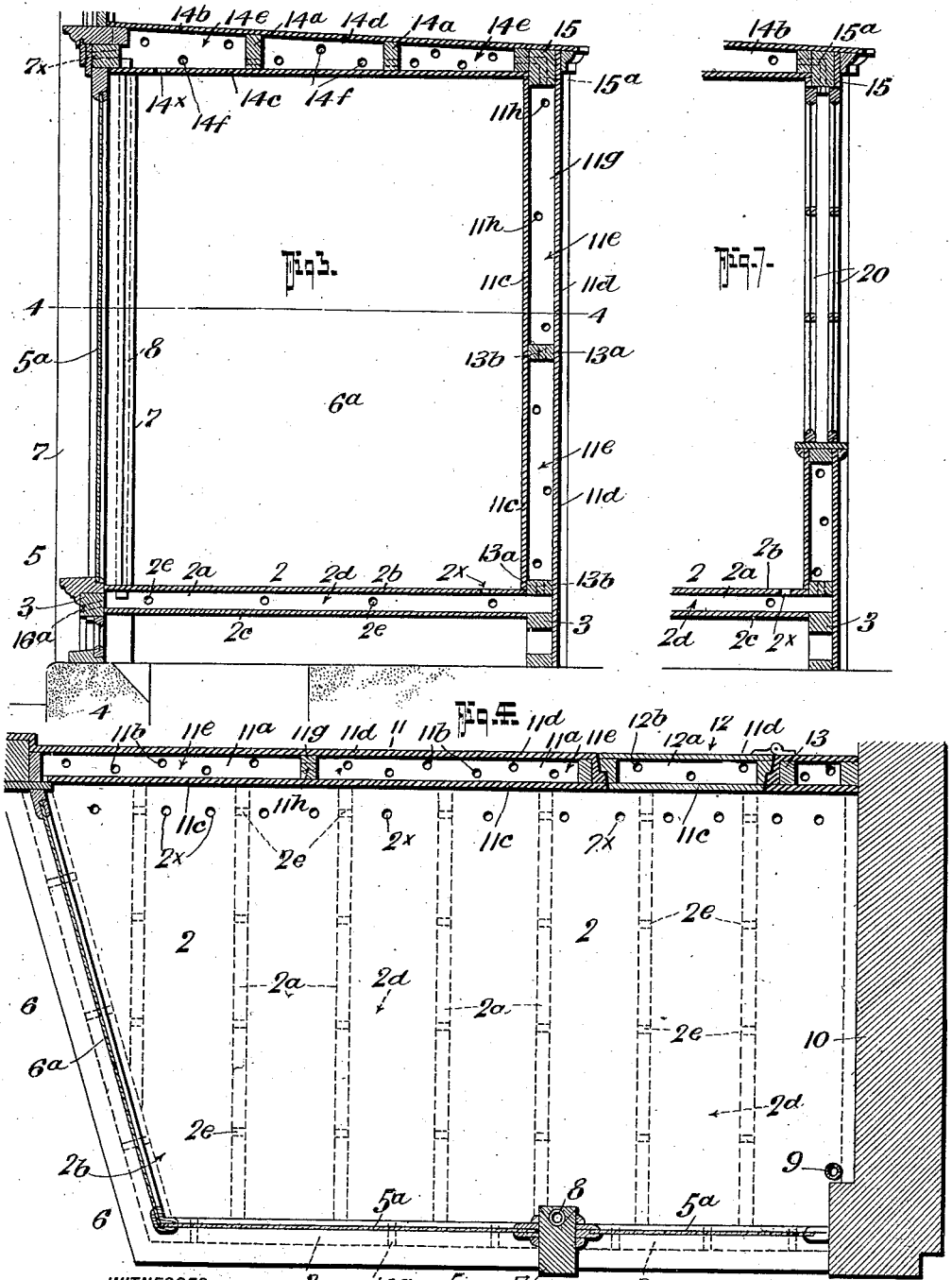

No. 884,404.
PATENTED APR. 14, 1908.
P. H. MORRIS.
STORE WINDOW.
APPLICATION FILED DEC. 12, 1907.
3 SHEETS—SHEET 3.
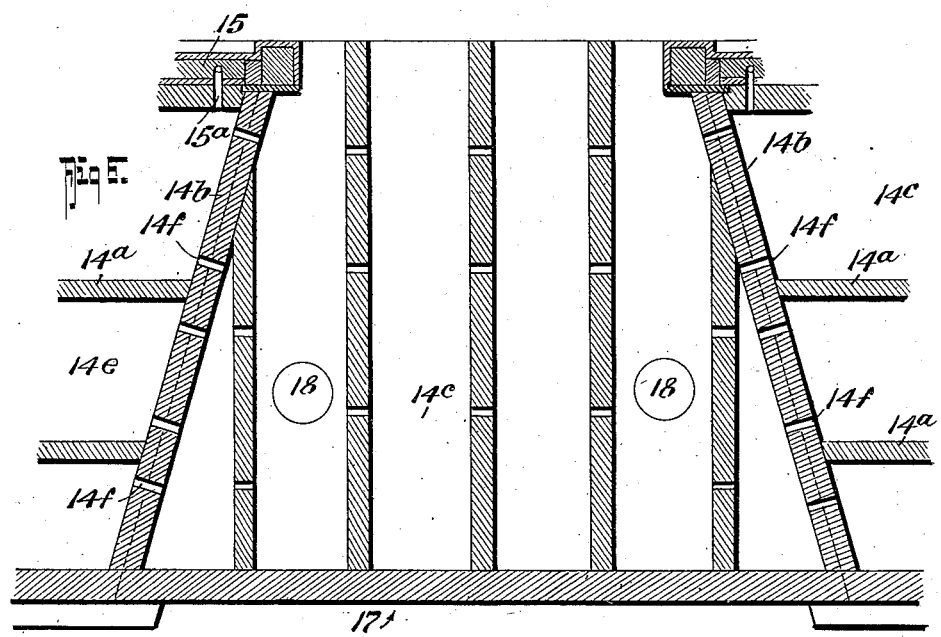
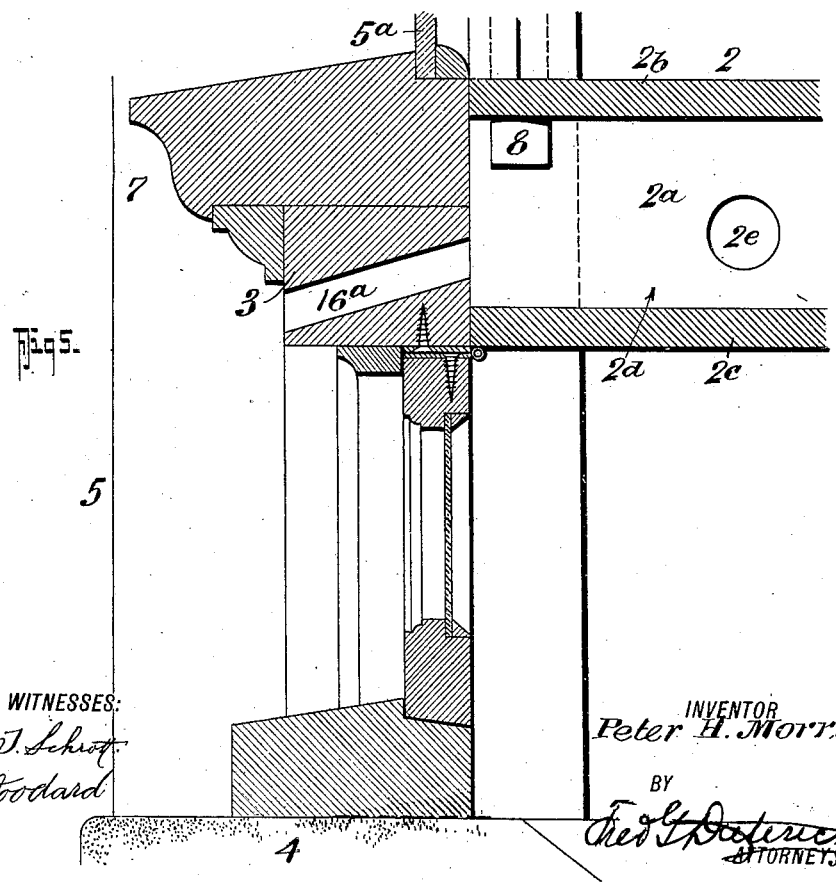
WITNESSES:
John T. Schrot
H. Woodard
INVENTOR
Peter H. Morris.
BY
Fred G. Dieterich
ATTORNEYS

UNITED STATES PATENT OFFICE.

PETER H. MORRIS, OF NEWTOWN, PENNSYLVANIA.

STORE-WINDOW.

No. 884,404.　　　　Specification of Letters Patent.　　　Patented April 14, 1908.

Application filed December 12, 1907. Serial No. 406,228.

*To all whom it may concern:*

Be it known that I, PETER H. MORRIS, residing at Newtown, in the county of Bucks and State of Pennsylvania, have invented certain new and useful Improvements in Store-Windows, of which the following is a specification.

My invention relates to certain new and useful improvements in the construction and arrangement of store windows, whereby the same will be thoroughly ventilated in such manner as to prevent frosting, and at the same time provide a practically dust-proof show window.

In its generic nature, my invention comprises a window constructed of a suitable framing, the exposed walls of which are of a double thickness with air spaces in between, the surfaces of the walls being supported by joists which are provided with ventilating apertures, means also being provided forming a practically complete circulation of air through the various parts of the structure in such manner that the temperature of the window, as a whole, will be evenly maintained and hence prevent frosting.

My invention also embodies certain novel construction, combination and arrangement of parts, all of which will be first described in detail, and then be specifically pointed out in the appended claims, reference being had to the accompanying drawings, in which:—

Figure 1, is a front elevation of a store window embodying my invention. Fig. 2, is a section on the line 2—2 of Fig. 1. Fig. 3, is a cross section on the line 3—3 of Fig. 1, showing the parts on a larger scale. Fig. 4, is an enlarged sectional plan on the line 4—4 of Fig. 3. Fig. 5, is an enlarged detail section of a portion of the window. Fig. 6, is a detail horizontal section on the line 6—6 of Fig. 1. Fig. 7, is a detail section of a slightly modified construction of a portion of the window.

Referring now to the accompanying drawings, in which like letters and numerals of reference indicate like parts in all of the figures, 1 represents the show window, which, as illustrated in the drawings, is of the double type, although only one of the windows 1 (one-half of what is shown in Fig. 1) may be used, if desired. The show window 1 comprises a floor 2 which consists of the supporting joists $2^a$, supported on sills 3, over the foundation 4. The joists $2^a$ are arranged in parallelism, as usual, and spaced the usual distance apart. The floor 2 also includes the upper facing or floor proper $2^b$ of the usual construction and a lining $2^c$, so as to leave chambers $2^d$ between the facings $2^b$—$2^c$ and the joists, the depth of the chambers $2^d$ being that of the joists $2^a$.

In order that a circulation of air may be maintained the various chambers $2^d$ are in communication with one another through air vents $2^e$ formed by boring a series of holes through the joists $2^a$.

The front and side 5 and 6 respectively, of the window are supported over the front and side sills 3 and contain the glass windows proper $5^a$ and $6^a$, respectively.

7 designates a column in the front of the window running the full height thereof, and preferably arranged within this column (or outside if desired) is a circulating pipe 8, which at the lower end communicates with one of the chambers $2^d$ of the floor, a second circulating pipe 9 being provided at a suitable place, which also is in communication with one of the chambers $2^d$ at its bottom. This pipe 9 may run up in the corner of the wall 10 if desired.

The back of the window 11 is formed of suitable studding $11^a$, which is provided with vent apertures $11^b$ and inner and outer facings $11^c$ and $11^d$ to form chambers $11^e$ between the same in a manner similar to the floor construction. Similarly constructed doors 12 are provided in the back wall by means of which access to the inside of the window may be obtained, the construction of the doors 12 being practically the same as that of the back wall and the doors 12 having the framing studs $12^a$ which may also be provided with ventilating apertures $12^b$ and the inner and outer facings or linings $11^c$ and $11^d$, as indicated. The door jamb or frame 13 has its base and top timbers $13^a$ provided with ventilating apertures $13^b$ and the bottom and top timbers of the doors 12 may have their apertures to register with those of the frame timbers 13 so that circulation may be had through the doors.

The vertical studdings $11^g$ of the back of the window are also provided with circulating vents $11^h$ so that a free circulation may be maintained at all times.

The top of the show window is constructed similarly to the floor with the longitudinal joists $14^a$ and the transverse joists $14^b$ lined on the inner and outer sides by linings $14^c$ and $14^d$ of any suitable material and comprises air chambers 14$^e$ between the same and the joists, ventilating apertures 14$^f$ being provided in such joists to bring all the chambers 14$^e$ into communication with one another.

The chambers 14$^e$ and the chambers 11$^e$ are in communication through vents 15$^a$ in the corner timbers 15.

The pipe 9 discharges into certain of the chambers 14$^e$ at the top of the window and ventilating apertures 16$^a$ are provided in the front sill 3 to communicate with the chambers 2$^d$ of the window at the upper or exposed portions thereof. The upper sill 6 at each side of the column 7 is also provided with a pair of vents 7$^\times$ communicating with the atmosphere and the interior of the pipe 8 at the top.

The lining 2$^b$ of the floor 2 is bored with a series of apertures 2$^\times$ at its rear and the facing or lining 14$^a$ of the top 14 is similarly provided with apertures 14$^\times$ at the front of the window.

When double windows are used, as shown in Fig. 1, the top 14 extends clear across the frame, and has its lining 14$^c$ exposed to the elements at the entrance 17 to the building. Where the ceiling crosses over the entrance 17, it is provided with registers 18 that open communication between the atmosphere and the inside of the ceiling of the window.

Instead of constructing the back of the window with blind doors, as shown in Fig. 3, the construction may be provided, as shown in Fig. 7, to provide hinged or sliding glazed sashes 20—20 so that the interior of the window may be visible in the inside as well as on the outside of the store.

Numerous detail changes in the construction and design of the window will necessarily have to be made to adapt the same to the particular use and building to which it is to be attached and form a part of, the essential features of my invention being the provision of the double walls and floor and ceiling and the provision of the apertured studding and joists with the ventilating apertures so arranged that a complete circulation of air may be had through practically all of the structure and maintain the same at an even temperature to correspond with the temperature of the atmosphere and thus prevent frosting or sweating of the windows.

From the foregoing taken in connection with the accompanying drawings it is thought the complete construction, operation, and numerous advantages of my invention will be readily understood by those skilled in the art to which the invention appertains.

What I claim is:—

1. A window comprising a transparent front, a bottom, a top and back portions, said bottom, top and back portions composed of a framework and spaced linings on the sides of said framework, and means for maintaining an air circulation between said spaced linings.

2. A window comprising a framing of joists and studdings, a transparent front for said window, said window including a bottom, a back and top, of double walls having air spaces between and inclosing the framing and studding, said framing and studding being provided with a series of ventilating apertures whereby communication may be had between the spaces between the double walls, ventilating pipes communicating between the double walled bottom and top, and means for admitting air from the atmosphere into the double walls.

3. A store window comprising a bottom consisting of a framing having ventilating apertures and a double lining for said framing inclosing air chambers, said air chambers of the bottom being in communication with the atmosphere, a transparent front for said window and a back therefor, said back comprising a framing having an outer and inner lining to inclose air chambers, said framing having ventilating apertures whereby the air chambers are in communication with one another, means whereby the air chambers of the back are in communication with those of the bottom, a top comprising a framing, an outer and inner lining inclosing air chambers, said framing having ventilating apertures to open up communication between all of said top air chambers, means opening communication between the air chambers of the top and those of the back, said bottom having its inner lining provided with ventilating apertures to open up communication between the air chambers of the bottom and the interior of the window and said top having its inner lining provided with corresponding ventilating apertures.

4. A store window comprising a bottom consisting of a framing having ventilating apertures and a double lining for said framing inclosing air chambers, said air chambers of the bottom being in communication with the atmosphere, a transparent front for said window and a back therefor, said back comprising a framing having an outer and inner lining to inclose air chambers, said framing having ventilating apertures whereby the air chambers are in communication with one another, means whereby the air chambers of the back are in communication with those of the bottom, a top comprising a framing, an outer and inner lining inclosing air chambers, said framing having ventilating apertures to open up communication between all of said top air chambers, means for opening communication between the air chambers of the top and those of the back, said bottom having its inner lining provided with ventilating apertures to open up communication between the air chambers of the bottom and the interior of the window and said top having its inner lining provided with corresponding ventilating apertures, the apertures of the bottom lining and those of the top lining being diagonally opposite one another.

5. A store window comprising a bottom consisting of a framing having ventilating apertures and a double lining for said framing inclosing air chambers, said air chambers of the bottom being in communication with the atmosphere, a transparent front for said window and a back therefor, said back comprising a framing having an outer and inner lining to inclose air chambers, said framing having ventilating apertures whereby the air chambers are in communication with one another, means whereby the air chambers of the back are in communication with those of the bottom, a top comprising a framing, an outer and inner lining inclosing air chambers, said framing having ventilating apertures to open up communication between all of said top air chambers, means for opening up communication between the air chambers of the top and those of the back, said bottom having its inner lining provided with ventilating apertures to open up communication between the air chambers of the bottom and the interior of the window, and said top having its inner lining provided with corresponding ventilating apertures, the apertures of the bottom lining and those of the top lining being diagonal to one another, and circulating pipes in communication with the air chambers of the bottom and the top.

6. A store window comprising a bottom consisting of a framing having ventilating apertures and a double lining for said framing inclosing air chambers, said air chambers of the bottom being in communication with the atmosphere, a transparent front for said window and a back therefor, said back comprising a framing having an outer and inner lining to inclose air chambers, said framing having ventilating apertures whereby the air chambers are in communication with one another, means whereby the air chambers of the back are in communication with those of the bottom, a top comprising a framing, an outer and inner lining inclosing air chambers, said framing having ventilating apertures to open up communication between all of said top air chambers, means for opening communication between the air chambers of the top and those of the back, said bottom having its inner lining provided with ventilating apertures to open up communication between the air chambers of the bottom and the interior of the window and said top having its inner lining provided with corresponding ventilating apertures, the apertures of the bottom lining and those of the top lining being diagonally opposite to one another, the top of said window projecting to one side thereof and provided with an air register in communication with the atmosphere.

7. The combination with a pair of show windows, and their framing, said show windows including bottom, top and back walls inclosing air spaces in communication with one another, of means for maintaining a circulation of air in said air spaces and the interior of said windows.

8. The combination with a pair of show windows, and their framing, said show windows including bottom, top and back walls inclosing air spaces in communication with one another, of means for maintaining a circulation of air in said air spaces and the interior of said windows, said windows having their tops projected across from one to the other over a door-passage, and registers in said projecting portion of the tops to bring their air chambers into communication with the atmosphere.

PETER H. MORRIS.

Witnesses:
GEO. W. DE COURSEY,
CYRUS B. WHITE.